June 23, 1953 L. S. DEPWEG 2,642,757

POWER DRIVE UNIT FOR REMOTELY CONTROLLED TELEVISION RECEIVERS

Filed May 2, 1951 3 Sheets-Sheet 1

INVENTOR.
LEONARD SYLVESTER DEPWEG
BY Alden D. Redfield
Charles M. Hogan
ATTORNEYS.

INVENTOR.
LEONARD SYLVESTER DEPWEG.
BY Alden D. Redfield
Charles M. Hogan
ATTORNEYS June 23, 1953 L. S. DEPWEG 2,642,757

POWER DRIVE UNIT FOR REMOTELY CONTROLLED TELEVISION RECEIVERS

Filed May 2, 1951 3 Sheets-Sheet 3

INVENTOR.

LEONARD SYLVESTER DEPWEG

BY Alden D. Redfield
Charles M. Hogan.

ATTORNEYS.

Patented June 23, 1953

2,642,757

UNITED STATES PATENT OFFICE 2,642,757

POWER DRIVE UNIT FOR REMOTELY CONTROLLED TELEVISION RECEIVERS

Leonard Sylvester Depweg, Hamilton, Ohio, assignor to Avco Manufacturing Corporation, Cincinnati, Ohio, a corporation of Delaware Application May 2, 1951, Serial No. 224,227

2 Claims. (Cl. 74—789)

The present invention relates generally to remote control mechanisms for television receivers and specifically to a novel power unit for adjustably setting a continuous type of tuner.

Continuous radio-frequency tuning is well known in the art. Devices exploiting such tuning include a plurality of variable inductance units ganged on a main common shaft, this shaft being rotatably adjusted to select the desired channel. Continuous tuners are described in many publications, including the following. Grob, Basic Television—Principles and Servicing, pp. 379 and 380, McGraw-Hill Book Company, Inc., New York, 1949; Photofact Television Course, Howard W. Sams & Co., Inc., Indianapolis, 1949, pp. 151 et seq. Accordingly it is not necessary to describe in detail a continuous tuner per se, of the type used in continuously variable inductively tuned input systems. Reference is made to those publications for detailed information relating thereto.

One of the difficulties which has heretofore been experienced in automatic tuning arises from high speed overshooting of the desired setting of the tuner unit. This difficulty can be overcome by providing for a vernier control, so that the desired setting may be rapidly approached and, if overshot, can be slowly reapproached until attained. It is accordingly an object of the present invention to provide, in a power unit for a remotely controlled television receiver, a novel two-speed power transfer mechanism which is effective in controlling the tuner to bring it rapidly to a point close to the desired setting and then gradually and precisely to the desired setting.

Another object of the invention is to provide an "on-off" switch arrangement which functions automatically to open-circuit the electrical power supply for the television receiver when the tuner is brought to a predetermined terminal setting. A further object of the invention is to provide an adjustable switch so arranged that it can be opened at any setting of the tuner within a relatively wide range of terminal settings.

For a better understanding of the present invention, together with other objects, advantages, and capabilities thereof, reference is made to the following description of the accompanying drawings, in which there is fully disclosed a preferred illustrative embodiment of a remotely controlled power or driving unit for a continuous type tuner.

Figures 3, 5:
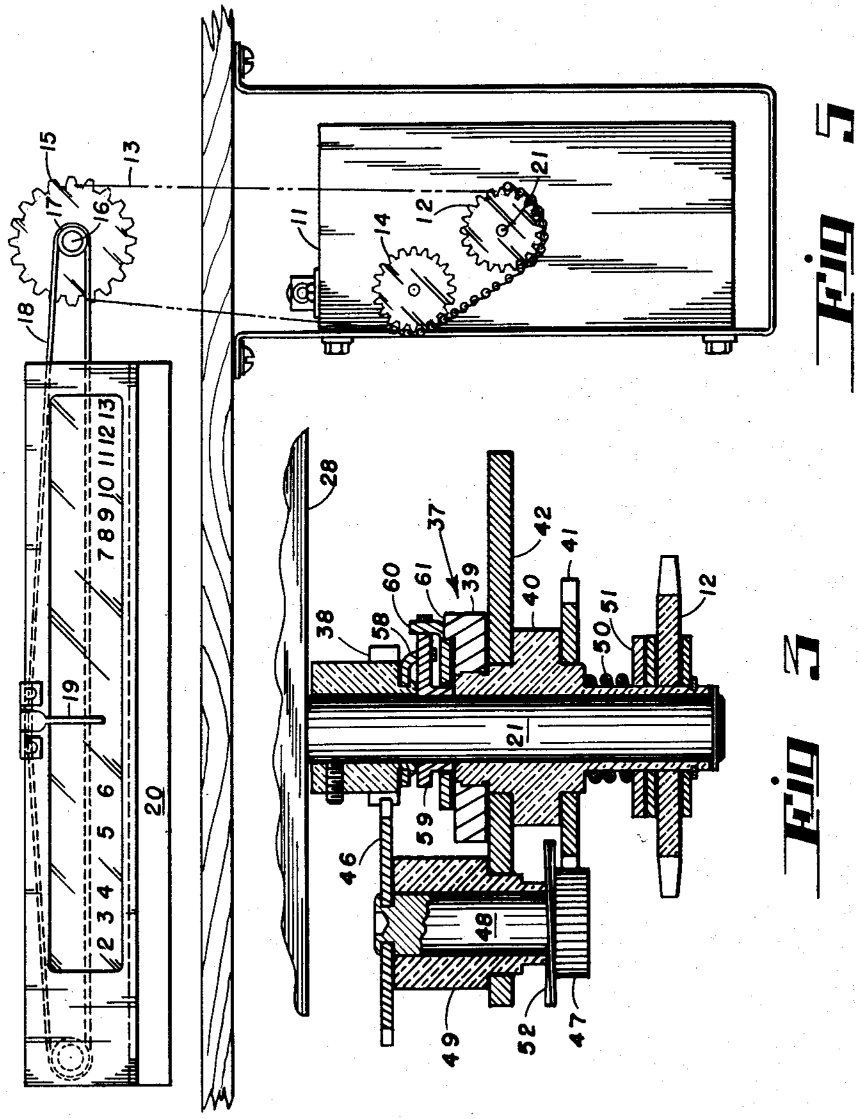
Fig. 3 is a top view of the gearing of the novel two-speed power transmitting mechanism illustrated in Figs. 1 and 2.
Fig. 5 is a front view of a television receiver chassis, with parts broken away, showing the relationship between the tuner, the indicator dial, and my novel power unit.
Figure 4:
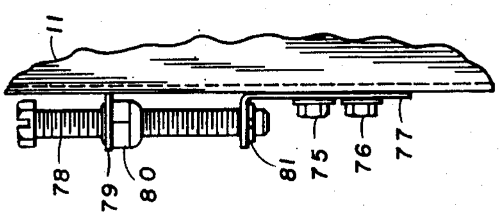
Fig. 4 is a fragmentary left-side view of the device illustrated in Figs. 1 and 2, showing the screw for adjusting the "on-off" switch.

My novel remotely controlled power unit is disposed in a metallic box-like housing 11 which may be placed on the right side of a television receiver, as illustrated in Fig. 5. Projecting from the power unit is a main sprocket 12, coupled by a chain 13 to the sprocket 14 included in the "on-off" switch controlling mechanism, and the sprocket 15, located on the same shaft 16 as the continuous type tuner (not shown) for the television receiver. Suitably coupled to shaft 16, as by a pulley 17, is a cord 18 to which is attached the indicator pointer 19 of a slide rule dial 20. Disposed on the front side of the dial are indicia covering the various television channels presently approved by the Federal Communications Commission, the channels in the lower band being numbered 2 through 6, and those in the upper band being numbered 7 through 13. It will be understood that when the sprockets 12, 14, and 15 rotate in a counter-clockwise direction, the pointer 19 moves to the left (Fig. 5) and the continuous tuner is adjusted through the lower portion of its range. On the other hand, when the sprockets rotate in a clockwise direction, then the tuner setting is varied in the direction of channels of increasing frequency. Included in the power unit 11 is a main drive shaft 21. Sprocket 12 controls the action of all of the following elements: 13, 14, 15, 16, 17, 18, and 19.

The description now proceeds first to a discussion of the mechanism for driving the main drive shaft 21, and next to a discussion of my novel power transmission device for coupling the drive shaft 21 to the sprocket 12, either directly, for high-speed operation, or indirectly, for low-speed operation.

The mechanism for driving the main driving shaft 21 is purely conventional and is of the prior art. That drive shaft is powered by a prime mover 22 in the form of a shaded pole motor, through a conventional speed-reduction device. This gear reduction is conventional and need not be further shown or described herein. It is a standard speed reduction for rotating the main drive shaft at approximately 40 revolutions per minute.

One of the main features of the present invention relates to a novel two-speed power transfer device or mechanism between the main drive shaft 21 and the elements herein collectively designated by the reference numeral 37 and referred to as the "driven element." The rotation of the continuous tuner itself is controlled by the rotation of the driven element 37 (through 12, 13, 15, and 16), and the invention provides a novel arrangement for two-speed power transmission between the main drive shaft 21 and the driven element 37. Such a two-speed motion transmitting device is particularly desirable in order to provide for vernier tuning. It will be understood by those skilled in the art that a conventional method of manual tuning comprises the following steps: (1) rapidly turning a dial until the desired setting is somewhat "overshot"; (2) turning the dial back toward the desired setting slowly; and (3) oscillating the dial slowly until the desired setting is attained. The purpose of this two-speed mechanism is to permit the tuner to be brought gradually to the optimum setting after such overshooting and therefore to perform with power drive the same functions that are normally performed manually. To this end there is provided a very large slack in the clutching means which directly couples the main drive shaft 21 to the driven element 37 for synchronous rotation or high-speed drive. During slack conditions the main drive shaft 21 is mechanically coupled to the driven element 37 by a speed-reduction device which comprises one of the novel subassemblies of the present invention. Upon any reversal of rotation of the driving element, following high-speed drive, the direct coupling between the driving element 38 and the driven element is broken by opening of the clutching means, and the driving shaft 21 is indirectly coupled to the driven element for slow-speed operation by this novel speed-reduction device. After a predetermined angular displacement of the driven element 37, the various clutch elements comprising the direct coupling engage, whereupon the driving element 38 is again directly coupled to the driven element and high-speed motion-transmission again occurs.

In accordance with the invention, therefore, there is provided a novel combination including: First, the main drive shaft 21, suitably journaled in bearings provided by the brackets 27 and 28. The second element of this novel combination is a relatively small-diameter drive pinion 38 fixedly mounted on or secured to the main shaft 21 for rotation therewith. The third element of the novel combination is a driven element, the various portions of which are collectively designated by the reference numeral 37. The driven element comprises a number of parts consisting of an inner dog collar 39, an outer main bushing 40, and a relatively large diameter gear 41 rigidly secured to an outer reduced portion of main bushing 40. Elements 39, 40 and 41 are secured together and rotate in unison. It will therefore be seen that the driven element 37 is freely mounted on the main drive shaft 21 and formed with gear teeth constituting a relatively large diameter gear 41.

The fourth element in the combination is a novel speed-reduction device. Included in this speed reduction device is a support 42 mounted concentrically with but freely rotatable on an inner reduced portion of the main bushing 40. Incorporated in the novel speed-reduction device is a friction brake system including a U-shaped spring 43, the bight of which is secured to a bracket 44 fixedly mounted on bracket 28, the legs of which spring frictionally retard rotation of the periphery of support 42. The leg terminals are adjustably pulled together by an adjusting screw 45 suitably arranged to impose a sufficient drag on support 42 to prevent its rotation during low-speed operation of the driven element.

Coming now to the means for indirectly coupling the drive pinion 38 to the driven element 37, this means comprises a relatively large-diameter gear 46 meshing with drive pinion 38, and a relatively small-diameter pinion 47 meshing with gear 41 of the driven element, the pinion 47 and the large diameter gear 46 being secured to opposite ends of an intermediate shaft 48. This shaft is laterally displaced from the main drive shaft 21 and is suitably journaled in bearing 49 secured to support 42, bearing 49 projecting through the support 42 and the gears being mounted on each side of said support.

During low-speed operation of the device, the motion train is traced as follows: From main drive shaft 21 and drive pinion 38 to large-diameter gear 46, then to pinion 47 and finally the large-diameter gear 41 on the driven element.

The driven element part 40 drives sprocket 12 through a helical-spring-type slip clutch comprising a spring 50, compressed between the front of the main bushing 40 and a metallic washer 51 fixed to pulley 12. This spring-type slip clutch is provided in order to prevent breakage of the stops which limit the low frequency and high frequency adjustments of the tuner, the slippage in the clutch being such that sprocket 12 can remain stationary under conditions of extreme load while bushing 40 continues to rotate. It will be understood, however, that brushing 40, gear 41 and sprocket 12 rotate in synchronism during normal conditions of operation—i. e., those conditions which prevail when further rotation of the tuner inductors is not prevented by one of its rotor stops.

It will further be understood that support 42 does not rotate during low speed operation. In addition to the brake spring 43, the support-braking system also includes a spring washer 52, disposed between pinion 47 and the front face of bearing 49. The operation of this spring washer is such as to permit the bias of brake spring 43 on support 42 to be decreased. In order to impart an understanding of the operation of spring washer 52, conditions of low-speed operation will be postulated, and the following further assumptions will be made: (1) That drive pinion 38 is being driven in a clockwise direction (Figs. 1 and 2); and (2) that heavy load conditions tend to prevent clockwise rotation of gear 41. Under these assumed conditions reduction gears 46 and 47 rotate counter-clockwise and tend to make intermediate shaft 48 revolve relative to main shaft 21 in the direction indicated by arrow 54 (Fig. 8), developing low output torque, pinion 47 tending to crawl counter-clockwise about gear 41, the moment of shaft 48 tending to turn support 42 counter-clockwise. On the other hand, when support 42 is restrained against counter-clockwise rotation, under such conditions, intermediate axis 48 is held in one position and substantial output torque is developed. It has been indicated how the clockwise rotation of drive pinion 38 tends to produce a counter-clockwise rotation of support 42 which is prevented by leaf spring 43. The undesired rotation of support 42 during low-speed operation is also restrained by washer 52. In order to impart an understanding as to the operation of spring washer 52, the same conditions are again assumed. If under those conditions intermediate shaft 48 could be locked so that gears 46 and 47 could not turn at all, then in that event those gears would tend to crawl in a clockwise direction relative to gear 41 and the axis of shaft 48 would exercise a turning moment relative to support 42 which would tend to turn the support in a clockwise direction. It follows then that any "tightening" or restraint on shaft 48 exerts a moment relative to support 42 which is conducive to clockwise rotation. This moment therefore permits the use of less bias between spring 43 and support 42, because the purpose of that bias is to prevent counter-clockwise rotation of support 42 under the assumed conditions. Therefore both the spring 43 and the spring washer 52 are included in a brake system for preventing rotation of support 42 during low-speed operation. The washer 52 is compressed between bearing 49 and pinion 47 to restrain turning of shaft 48. Conversely, when pinion 38 rotates in a counter-clockwise direction and when a load is imposed on gear 41, the tendency of support 42 to rotate in a clockwise direction is impeded by two factors: (1) the bias of spring 43; and (2) the stiffening action of spring washer 52, which introduces an opposite tendency in the support to rotate in a counter-clockwise direction, thereby in part neutralizing the first-mentioned tendency and permitting the utilizing of decreased bias between spring 43 and disc 42.

Figure 6:
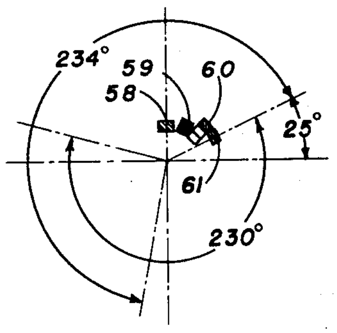
Fig. 6 is a schematic view showing the relative positions of the several projections in the clutch when the tuner is being driven in one direction.
Figure 7:
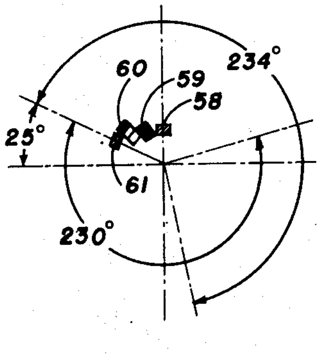
Fig. 7 is a view corresponding to Fig. 6, but showing the relationships of the clutch parts when the tuner is driven in the opposite direction.

The fifth element of my novel two-speed power transfer device comprises clutching means for coupling the driven element directly to the drive pinion 38 while providing a large degree of slack between the driven element and the drive pinion. When the slack is taken up by engagement of all of the elements of this clutch, then the drive pinion 38 is coupled directly to the driven element for high speed operation. This clutching means comprises a pinion dog washer 58 rigidly secured to the drive pinion 38, a dog bushing 59, freely mounted on the drive shaft, and a dog washer 60 also freely mounted on the drive shaft. Dog washer 58 includes a first integral projection which extends radially outwardly and forwardly. This projection is equivalent to a projection on the drive pinion 38 itself. This first projection can engage with either side of a radially outwardly extending second integral projection on the dog bushing 59, and this second projection in turn can engage with either side of an outwardly and rearwardly extending third projection on the dog washer 60. The third projection can engage with either side of a fourth projection 61 integral with the dog collar 39 of the driven element. The third projection is so shaped as to clear the first. The fourth can engage with the third only. Each of the elements 59, 60 and 39 is freely mounted relative to the shaft 21, so that the driving pinion 38 does not directly couple with dog collar 39 of the driven element until all of the projections are engaged: i. e., the first abuts the second, the second abuts the third, and the third abuts the fourth. Fig. 6 shows the relative positions of the projections when pinion 38 is directly driving the driven element in a clockwise direction. Fig. 7 shows the corresponding positions when the driven element is being directly driven in a counter-clockwise direction. During high-speed or direct-drive conditions, the support 42 overcomes the bias of the friction brake 43 and rotates in synchronism with the drive pinion 38, transporting the reduction gears 46 and 47 as inert masses, these gears simply revolving about drive shaft 21 but not rotating.

A typical cycle of operation is now described. The device is in high speed operation. Shaft 21 and pinion 38 turn clockwise. The tuner is approaching higher frequency settings. The projection on dog washer 58 engages one side of the projection on dog bushing 59 and that projection in turn engages one side of the projection on dog washer 60. The third projection in turn engages one side of the fourth projection 61 on dog collar 39, driving members 39, 40, 41, 42, 12, and 15 clockwise at high speed. Gears 46 and 47 do not rotate on axis 48 but are transported as support 42 rotates clockwise. Assume that the desired setting—channel 7, for example—is overshot. The motor 22 reverses, turning drive shaft 21 and drive pinion 38 counter-clockwise. The clutch 58, 59, 60 now opens and high-speed operation ceases. The device is now in low-speed operation, support 42 remaining stationary while gears 46 and 47 rotate clockwise, driving members 39, 40, 41, 12, and 15 counter-clockwise at low speed. The projection on dog washer 58 parts from that on dog bushing 59, but, since pinion 38 rotates at a greater rate than driven element 37, the projection on dog washer 58 finally abuts the other side of the second projection on bushing 59 and drives bushing 59 counter-clockwise until the projection on bushing 59 strikes the other side of the projection on dog washer 60. The counter-clockwise rotation of elements 37, 58, 59, and 60 continues until the third projection on dog washer 60 strikes the other side of the fourth projection on dog collar 39, whereupon closing of the clutching means 58, 59, 60 is completed and members 39, 40, 41, 42, 12, and 15 are driven counter-clockwise at high speed. I prefer to arrange the gearing so that the low-speed operation occurs over a 230° rotation of the driven element, the driving pinion 38 rotating approximately 2.64 turns between cessation of high speed operation in one direction and cessation of low speed operation in the other direction. The 230° zone of slack in the driven element permits a fine adjustment to be made by oscillating the tuner within a narrow range of the desired setting.

Figure 1:
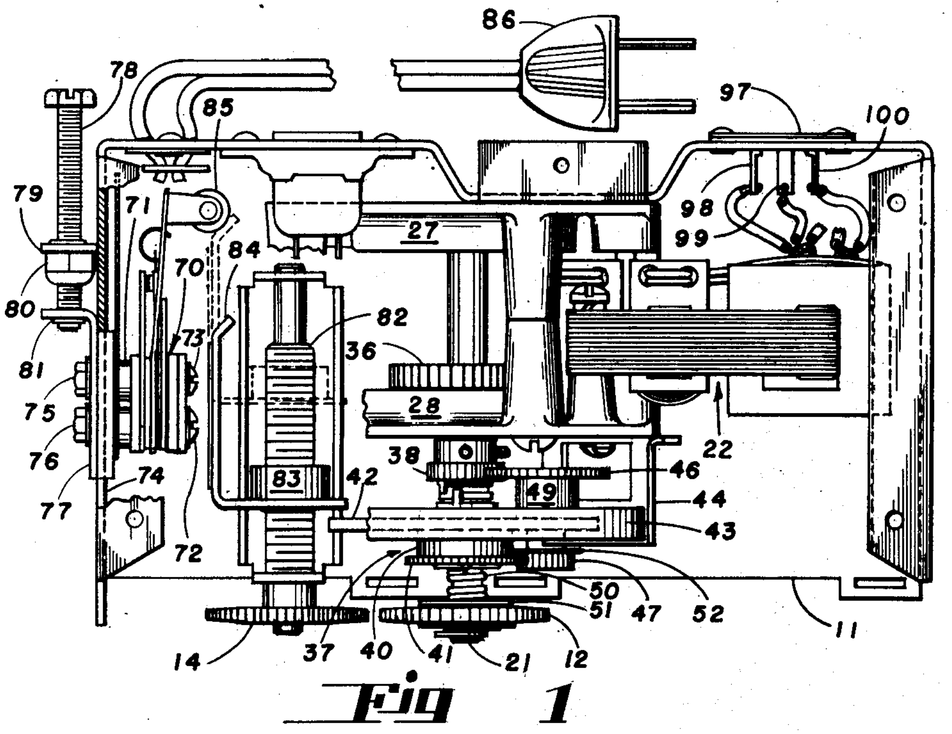
Fig. 1 is a top plan view of the novel remotely controlled power unit for television receivers.
Figure 2:
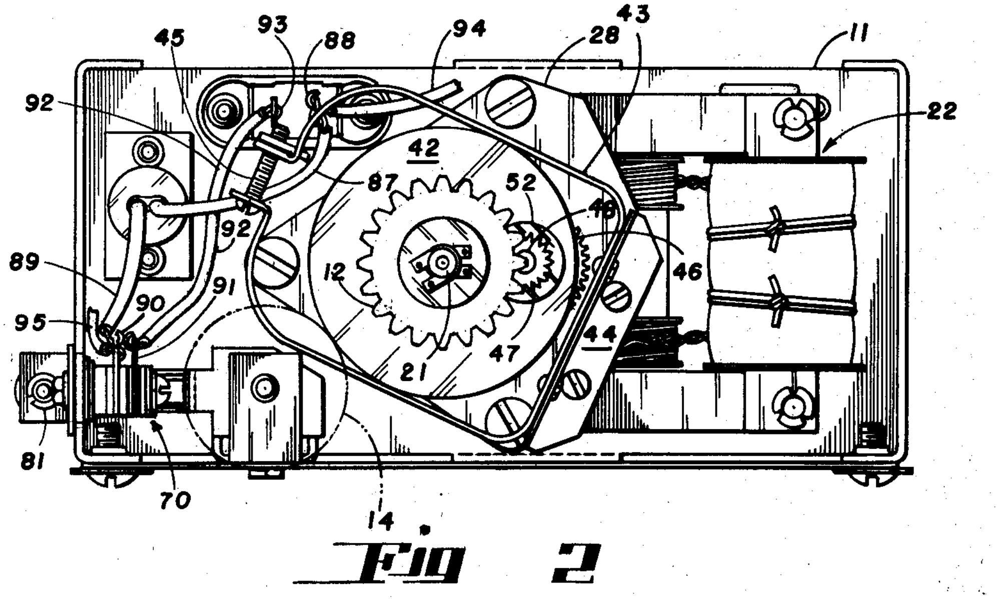
Fig. 2 is a front view thereof.

The invention also comprises an "on-off" toggle switch 70, mounted on a base 71. The base 71 is adjustably positioned in a fore and aft direction, by screws 72 and 73, projecting through a guide slot 74 formed in the lower left side of housing 11 (Figs. 1 and 2). Insulation is provided between the switch and the base 71. Nuts 75 and 76 are tightened down on bracket 77 to secure the switch in the desired position. The subassembly of switch 70, screws 72 and 73, nuts 75 and 76, and bracket 77 is positioned by an adjusting screw 78, mounted on lug 79, integral with housing 11. Threaded on to the adjusting screw 78 is a stop nut 80. The unthreaded tip of the adjusting screw is secured to bracket 77 by a lock washer 81.

As before indicated, sprocket 14 is actuated by the same chain 13 that drives the tuner. This sprocket is secured to a lead screw 82 and the lead screw is threaded to a nut 83 carrying a cam 84 in such manner as to advance the cam toward roller 85 on toggle switch 70 when sprocket 14 and lead screw 82 turn counter-clockwise (as when the tuner setting is decreasing in frequency). When the cam 84 strikes the roller 85, the switch 70 is opened, breaking the power supply circuit to the television receiver and de-energizing the receiver. It has been indicated that the switch 70 is opened when the tuner setting is decreasing in frequency. If it be assumed that channel 2 is available in the area in which a particular receiver is installed, then switch 70 would be positioned toward the rear of the housing by a proper adjustment of screw 78, to assure that power would be supplied to the receiver when the continuous tuner is set for channel 2. On the other hand, let it be assumed that channels 2 and 3 are not available to a particular receiver and that channel 4 is the lowest frequency channel available. In such case the switch 70 would be positioned by screw 78 further away from the rear of the housing, so that the rearward travel of cam 84 required to open the switch would be decreased, switch 70 then opening to break the power circuit to the receiver before reaching the channel 3 setting. It will be understood that whenever the viewer desires to de-energize the receiver and to cut it from the supply source, the motor is operated in the direction appropriate to advance cam 84 toward the rear of the housing. The switch arrangement herein shown has the advantage that the motor can be turned off as soon as the tuner setting passes the lowest available channel in the community without the necessity of continuing to run the motor until the tuner strikes its low frequency stop.

Figures 8, 9:
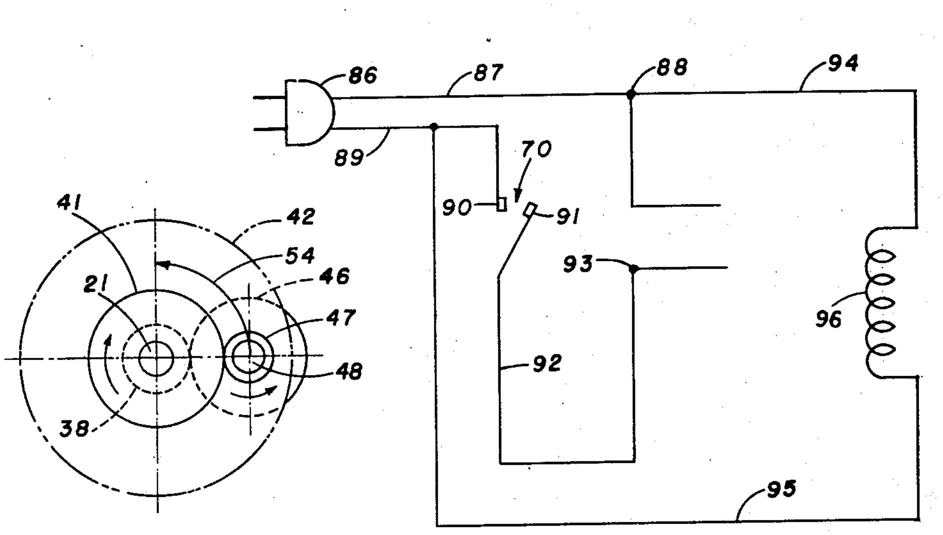
Fig. 8 is a gear diagram, in schematic form, utilized as an aid in describing the invention.
Fig. 9 is a circuit diagram showing the relationship between the "on-off" switch, the motor field, and the power supply circuit for the television receiver proper.

Referring now specifically to Fig. 9, a wiring diagram of the main motor field circuit 96 and associated circuits is shown. Power is supplied from a household source (not shown) through a plug 86, one terminal of which is connected by conductor 87 to socket terminal 88, the other terminal of which is connected by a conductor 89 to one of the "on-off" switch terminals 90. The other "on-off" switch terminal 91 is connected by conductor 92 to socket terminal 93. The power supply circuit for the television receiver proper is plugged into socket terminals 88 and 93 so that, when switch 70 is closed and plug 86 is connected to a household outlet, the television receiver is energized. The main motor field 96 is connected by conductor 94 to socket terminal 88 and by conductor 95 to switch terminal 90, so that the motor field is always placed across the terminals of plug 86. The shading coils of the motor are brought out to terminals provided in a suitable socket 97. Terminals 98 and 99 are connected in circuit by the operator to cause the motor armature to turn in one direction, and the circuit between terminals 99 and 100 is closed to cause the motor to rotate in the opposite direction. The operator holds in his hand a switch (not shown) which is suitably connected by a plug and cord to socket 97, such a switch being shown in the copending patent application of Arthur Donald Baylor for "Indicating Device for Use in Remote Control of Television Receiver," Serial No. 203,723, filed in the U. S. Patent Office December 30, 1950, and assigned to the same assignee as the present application and invention.

While I do not desire to be limited to any specific parameters, the following have been found adequate in one specific embodiment of the invention:

| Gear | No. of Teeth |
|---|---|
| 38 | 26 |
| 46 | 44 |
| 47 | 18 |
| 41 | 52 |
| 12 | 20 |

While there has been shown what is considered at present to be the preferred embodiment of the invention, it will be understood that various modifications and substitutions of equivalents may be made therein without departing from the true scope of the invention as defined by the appended claims.

Having fully disclosed my invention, I claim:

1. In a mechanism for tuning a television receiver, a two-speed power transmission device, comprising: a drive shaft; a relatively small-diameter drive pinion fixedly mounted on said shaft; a driven element freely mounted on said shaft and formed with gear teeth constituting a relatively large diameter gear; a speed-reduction device comprising a support mounted concentrically with but freely rotatable with respect to said driven element, a friction brake for yieldably restraining said support against rotation, said friction brake comprising a leaf spring biased against the edge of the support to prevent rotation of the support counter to rotation of the drive pinion during low-speed operation, a second shaft laterally displaced from said drive shaft and projecting through said support, and a pair of speed-reduction gears mounted on said second shaft, the relatively large-diameter reduction gear meshing with said drive pinion and the relatively small-diameter reduction gear meshing with said driven element, said reduction device transmitting motion indirectly from said drive pinion to the driven element when the drive pinion and the driven element are not clutched to each other; and clutching means for coupling the drive pinion directly to the driven element comprising: a first projection on the drive pinion, a ring freely mounted on said drive shaft and having a second projection engageable with the first-mentioned projection, another ring freely mounted on said drive shaft and having a third projection engageable with the second but not with the first projection, and a fourth projection on said driven element engageable solely with the third projection; whereby when all of said projections are engaged to close the clutching means the drive pinion is directly coupled through said projections to the driven element, the support then overcoming the bias of the friction brake and revolving said reduction gears without axial rotation until the drive pinion is reversed to open the clutching means.

2. In a mechanism for tuning a television receiver, a two-speed power transmission device, comprising: a drive shaft; a relatively small-diameter drive pinion fixedly mounted on said shaft; a driven element freely mounted on said shaft and formed with gear teeth constituting a relatively large diameter gear; a speed-reduction device comprising a support mounted concentrically with but freely rotatable with respect to said driven element, a friction brake for yieldably restraining said support against rotation, said friction brake comprising two parts, one of which consists of restraining means acting on the periphery of the support and the other of which consists of elastic means restraining rotation of the elements of the speed-reduction device, a second shaft laterally displaced from said drive shaft and projecting through said support, and a pair of speed-reduction gears mounted on said second shaft, the relatively large-diameter reduction gear meshing with said driven element, said reduction device transmitting motion indirectly from said drive pinion to the driven element when the drive pinion and the driven element are not clutched to each other; and clutching means for coupling the drive pinion directly to the driven element comprising: a first projection on the drive pinion, a ring freely mounted on said drive shaft and having a second projection engageable with the first-mentioned projection, another ring freely mounted on said drive shaft and having a third projection engageable with the second but not with the first projection, and a fourth projection on said driven element engageable solely with the third projection; whereby when all of said projections are engaged to close the clutching means the drive pinion is directly coupled through said projections to the driven element, the support then overcoming the bias of the friction brake and revolving said reduction gears without axial rotation until the drive pinion is reversed to open the clutching means.

LEONARD SYLVESTER DEPWEG.

References Cited in the file of this patent

UNITED STATES PATENTS

| Number | Name | Date |
|---|---|---|
| 918,632 | Wittmer | Apr. 20, 1909 |
| 1,104,710 | Scott | July 21, 1914 |
| 1,834,943 | Duncan, Jr. | Dec. 8, 1931 |
| 1,874,652 | Tanner | Aug. 30, 1932 |
| 2,572,965 | Akemann | Oct. 30, 1951 |